(12) United States Patent
Lin et al.

(10) Patent No.: US 9,490,075 B2
(45) Date of Patent: Nov. 8, 2016

(54) METHOD FOR FABRICATING SOLID ELECTROLYTIC CAPACITORS

(71) Applicant: APAQ TECHNOLOGY CO., LTD., Miaoli County (TW)

(72) Inventors: Ching-Feng Lin, Hsinchu County (TW); Ming-Tsung Chen, Changhua County (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 0 days.

(21) Appl. No.: 14/797,610

(22) Filed: Jul. 13, 2015

(65) Prior Publication Data

US 2015/0318116 A1 Nov. 5, 2015

Related U.S. Application Data

(62) Division of application No. 13/803,064, filed on Mar. 14, 2013, now Pat. No. 9,123,468.

(51) Int. Cl.
*H01G 9/00* (2006.01)
*B22F 3/02* (2006.01)
*C22C 21/00* (2006.01)
*H01G 9/042* (2006.01)
*H01G 9/045* (2006.01)
*H01G 9/052* (2006.01)
*H01G 9/15* (2006.01)

(52) U.S. Cl.
CPC ............... *H01G 9/0036* (2013.01); *B22F 3/02* (2013.01); *C22C 21/00* (2013.01); *H01G 9/0029* (2013.01); *H01G 9/0032* (2013.01); *H01G 9/045* (2013.01); *H01G 9/0425* (2013.01); *H01G 9/052* (2013.01); *H01G 9/15* (2013.01); *Y10T 29/417* (2015.01)

(58) Field of Classification Search
CPC .. H01G 11/82; H01G 9/0029; H01G 9/0036; H01G 9/045; H01G 9/15; Y10T 29/417; Y10T 29/435; B22F 3/02
USPC .......... 29/25.03, 25.42, 623.1, 730; 361/502, 361/503, 504, 508, 523, 525, 529, 531
See application file for complete search history.

(56) References Cited

U.S. PATENT DOCUMENTS 7,108,729 B2 * 9/2006 Kanetake ............... H01G 9/012
                                                    29/25.03
7,729,104 B2 * 6/2010 Sato ...................... B22F 1/0011
                                                    361/508

* cited by examiner

*Primary Examiner* — Thiem Phan
(74) *Attorney, Agent, or Firm* — Li & Cai Intellectual Property (USA) Office

(57) ABSTRACT

The instant disclosure relates to an improved method for the production of solid electrolytic capacitor, comprising the following steps. First, provide an insulating substrate. Next, form a plurality of conducting gels including aluminum powder on the insulating substrate. Thirdly, execute a high-temperature sintering process to metalize the conducting gels to form a plurality of aluminum plates. Next, form a dielectric layer on every aluminum plate. Then form an isolation layer on every dielectric layer to define an anodic region and a cathodic region. Lastly, form a conductive layer on the dielectric layer of every cathodic region, thus defining a solid electrolytic capacitor unit.

4 Claims, 7 Drawing Sheets

METHOD FOR FABRICATING SOLID ELECTROLYTIC CAPACITORS

CROSS REFERENCE TO RELATED APPLICATION

This application is a divisional application of U.S. application Ser. No. 13/803,064, filed on Mar. 14, 2013, and entitled "IMPROVED METHOD FOR FABRICATING SOLID ELECTROLYTIC CAPACITORS", the entire contents of which are hereby incorporated by reference.

BACKGROUND OF THE INVENTION

1. Field of the Invention

The instant disclosure relates to a method for fabricating solid electrolytic capacitors; in particular, a method for improving fabrication of solid electrolytic capacitors.

2. Description of Related Art

As technology rapidly evolves in the semiconductor industry, the demand for products requiring the use of semiconductors as well as the development of a more advanced, sophisticated electronic components become increasingly high. Semiconductor technologies such as flip chip packaging technology, laminated substrate design, and passive components design have an indispensable position in the semiconductor industry.

Take flip chip or ball grid array package structure for example, chips are configured on and electrically connected to the surface of the packaging substrate which is aggregated and formed from multiple layers of patterned circuits, and insulating layers. The patterned circuits are made by etching via photolithography while an insulating layer is disposed between two neighboring patterned circuits. Furthermore, in order to obtain the desired electrical characteristics for the package substrate, the substrate is further arranged with passive components such as capacitors, inductors and resistors which may be electrically connected to the chips and other electronic components through internal wiring of the substrate.

Among passive components, capacitors are classified according to the type of electrolyte applied, and can generally be categorized into liquid electrolytic capacitors and solid electrolytic capacitors. While the life span of the former is determined by the drying time of the liquid electrolyte, the latter uses a solid electrolyte, therefore eliminating the danger of drying electrolyte and providing a longer capacitor life span.

Traditional surface mounted tantalum solid capacitors usually comprise anode elements made from tantalum powder. However, the tantalum powder in the anode element leads to a relatively high technical threshold. For example: in order to increase overall capacitance, small particle size is essential to increase the overall reactive surface and consequently, the capacitance.

However, smaller particle size of the tantalum powder requires additional processing efforts to achieve. Thus, the smaller the particle size is required, the more processing is required to produce the desired size, and as a result, increases the costs. In addition, tantalum particles of smaller size make permeation of the cathode agent more difficult. Furthermore, since only after high-temperature sintering will the tantalum powder be able to form the tantalum sintered bodies on a substrate, the high-temperature sintering process required in the fabrication of traditional surface mounted solid capacitor renders the entire fabrication process more complex.

Additionally, prior art illustrates a multi-layer microcapacitor comprising a stacked structure of multiple metal layers and dielectric layers, thus facilitating the miniaturization of capacitors, thereby increasing the scope of applications. However, such a structure comes with a higher cost, a high probably of short-circuiting, and a plurality of complex processes during fabrication and assembly.

To address the above issues, the inventor strives via associated experience and research to present the instant disclosure, which can effectively improve the limitation described above.

SUMMARY OF THE INVENTION

In order to simplify the complexity of the process, reduce manufacturing costs, and obtain a high yield of the solid electrolyte capacitor, the instant disclosure provides a method for improving fabrication of a solid electrolytic capacitor. According to the first embodiment of the instant disclosure, the method includes an insulating substrate having formed a plurality of aluminum powder containing conductive gel bodies. The conductive gel bodies are arranged in a matrix formation, wherein a scribe line is defined between every two adjacent conductive gels. Thereafter, a high-temperature sintering process is applied on the conductive gel to form a complex aluminum substrate. Next, a dielectric layer is formed at the surface of each of the aluminum substrate, and then an isolation layer is formed at each of the dielectric layer to define an anodic region and a cathodic region. Successively, on each of the cathodic region, an electrically conductive layer is formed on the surface of the dielectric layer resulting in a solid electrolytic capacitor unit According to a second embodiment, the improved method includes an aluminum powder being cold compressed to form an aluminum pellet, followed by coating the surface of the aluminum pellet with a dielectric layer, and successively coating a conductive layer on the surface of the dielectric layer.

In summary, one of the embodiments of the instant disclosure, the conductive gel including aluminum powder is formed on the insulating substrate by partial screen printing, and then the conductive gel is sintered to form the aluminum substrate. As a result, one skilled in the art can accurately controls the thickness and size of the aluminum substrate, enhances the yield of the capacitor, and can also effectively simplify the complexity of the manufacturing process. Thus, reducing manufacturing costs and process time. In the second embodiment, aluminum pellets are formed by cold compressing an aluminum powder without a high-temperature sintering process resulting in an anode element with higher structural strength. Consequently, with such simplified manufacturing process, the complexity, cost, and process time of the capacitor fabrication are greatly reduced.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

Figure 1:
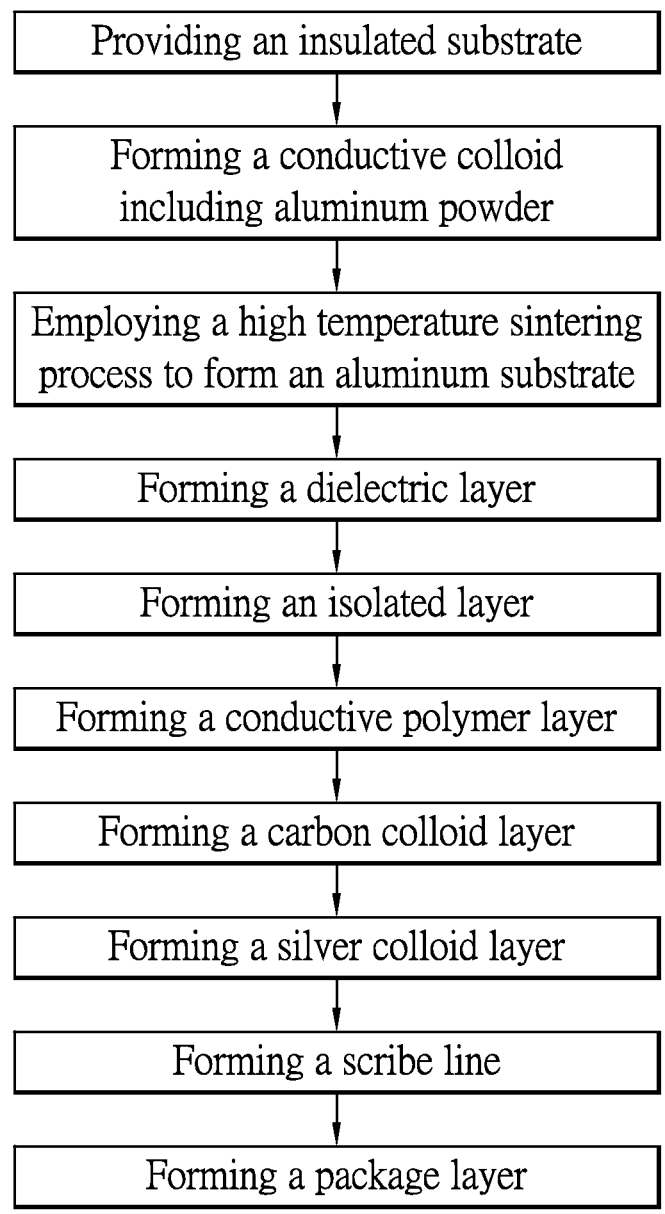
FIG. 1 is a flow chart illustrating a method for improving fabrication of solid electrolytic capacitors according to a first embodiment of the instant disclosure.
Figure 2:
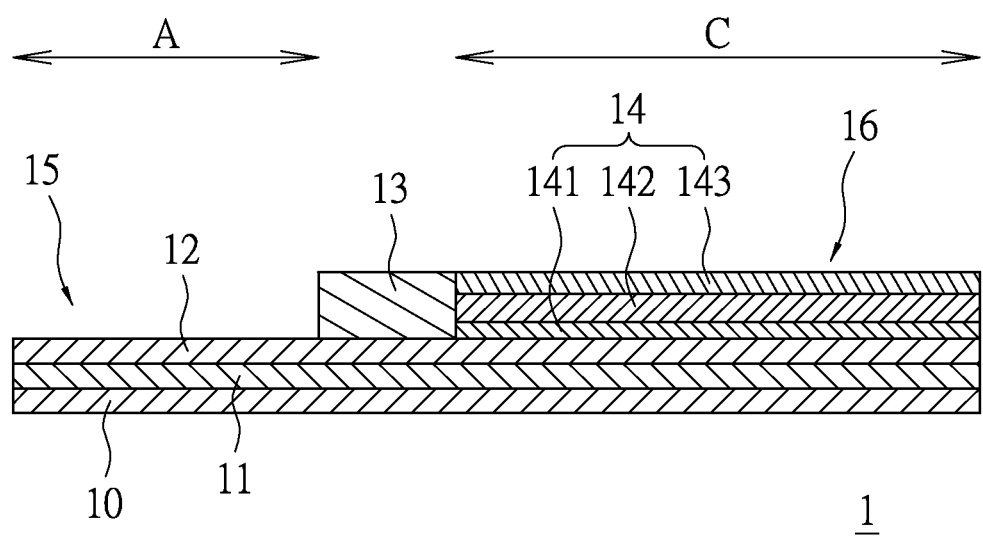
FIG. 2 is a cross-sectional view of a method for improving fabrication of solid electrolytic capacitors according to the first embodiment of the instant disclosure.
Figure 3:
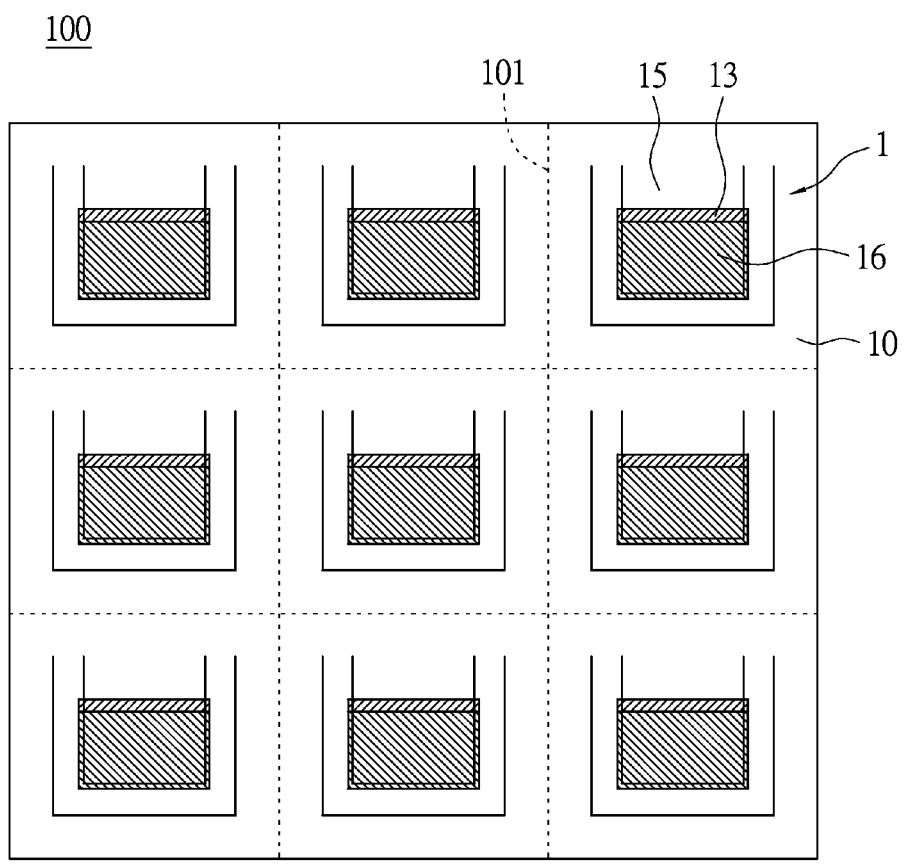
FIG. 3 is a top view of a method for improving fabrication of solid electrolytic capacitors according to the first embodiment of the instant disclosure.

The instant disclosure is a method for improving fabrication of the solid electrolytic capacitors especially suitable for the manufacturing of chips. Replacement of tantalum powder with aluminum powder further improves the problem encountered during the fabrication of the tantalum capacitors, and simplifies the fabrication of the multi-layer capacitor First Embodiment FIG. 1 is a flow chart for a first embodiment of the method, and in conjunction with FIGS. 2 and 3, the method is further explained in details.

Initially, an insulating substrate 10, preferably an aluminum oxide ($Al_2O_3$) substrate, is provided.

Next, a conductive gel (not shown in figures) including aluminum powder is formed, preferably formed by a thermosetting resin containing from about 0 wt % to about 50 wt %, a powder of aluminum containing from about 30 wt % to about 100 wt %, and a curing agent containing from about 0 wt % to about 50 wt %. The thermosetting resin is preferably an epoxy resin but is not limited thereto. Moreover, to improve conductivity, the particle size of the aluminum powder ranges from 0.05 to 5 microns. The aluminum powder can be pre-treated in order to provide uneven surfaces for obtaining more surface areas. The most suitable curing agent is preferred to be latent curable. Furthermore, the conductive gel may contain inorganic filler from about 0 wt % to about 50 wt % to reduce linear expansion. Examples of inorganic fillers contemplated for use in the conductive gel are silica, aluminum oxide, or aluminum hydroxide. The conductive gel can be formed on the insulating substrate 10 via techniques such as printing, spray-coating, or similar fashion, and is arranged in a matrix arrangement. Between every two adjacent conductive gels, a scribe line 101 is defined therebetween for facilitating substrate cutting in the process thereafter. Preferably, the conductive gel is formed on the insulating substrate 10 via partial screen printing for the precise control of length and thickness of the conductive gel formed, thus reduces fabrication cost and process time.

As the conductive gel is cured (metalized) on the insulating substrate 10, a complex aluminum substrate 11 (a sintered body of the conductive gel) is formed on the insulating substrate 10 via a high temperature sintering process. Preferably, the temperature and the time of the high temperature sintering process ranges from 300° C. to 550° C., and from 0.5 hour to 1.5 hours, respectively.

Moreover, the insulating substrate 10 and the aluminum substrate 11 are chemically treated, preferably anodized in the instant embodiment, to form an oxidized film, preferably an insulating alumina spacer, onto the surface of the insulating substrate 11, thus forming a dielectric layer 12. Furthermore, the chemical treatment may also use electrochemical formation or chemical solution to control the thickness of the dielectric layer 12 being formed. The dielectric layer 12 of the first embodiment is produced by an ammonium adipate based, a phosphoric acid based or the combination solution thereof. An alternative to the chemical treatment of the first embodiment is to immerse the insulating substrate 10 and the aluminum substrate 11 into an electrolyte bath for cross oxidation, heat treating and therefore producing a dense dielectric layer 12, preferably an oxidized film.

Furthermore, an insolation layer 13 such as an insulating resin is formed on the center surface of the dielectric layer 12 for isolating an anode capacitance 15 from a cathode capacitance 16 arranged on two opposite sides of the isolation layer 13, thus defining an anodic region A and a cathodic region C on the insulating substrate 10.

In addition, a conductive layer 14 including a conductive polymer layer 141, a carbon gel layer 142, and a silver gel layer 143 preferably arranged in the cathodic region C is formed on the surface of the dielectric layer 12. Specifically, the conductive polymer layer 141 is first formed on the dielectric layer 12, then the carbon gel layer 142 is formed on the conductive polymer layer 141, and sequentially the silver gel layer 143 is formed on the carbon gel layer 142 resulting in the conductive layer 14 and the cathode capacitance 16. The aluminum substrate 11 covered by the dielectric layer 12 and oppositely arranged from the cathode capacitance 16 of the isolation layer 13 is the anode capacitance 15. As a result, a solid electrolytic capacitor unit 100 is fabricated.

Moreover, the conductive polymer layer 141 is formed as a film by evenly coating a conductive polymer solution onto the surface of the dielectric layer 12 through a field-effect controlled precision coating technique, thus providing solid electrolytic qualities. The preferred conductive polymer maybe polyaniline, polypyrrole or polythiophen while the most preferred conductive polymer layer 141 is polyaniline. The composition of the conductive polymer solution includes anilines, oxidants and dopants. The carbon gel layer 142 can be formed by conductive gel, carbon paste. However, the form of the carbon gel layer 142 is not limited to the samples of the embodiment provided therein.

Furthermore, the solid electrolytic capacitor unit 100 is cut into a plurality of solid electrolytic capacitors 1 by preciously cutting the insulating substrate 10 conformingly along the scribe lines 101.

Successively, the anode capacitance 15 and the cathode capacitance 16 are separately arranged on a lead frame of a supporting member (not shown) to form two opposing electrodes. The solid electrolytic capacitor 1 is covered with coating materials such as heat and electrically insulating resins, then cured and aged to form a package structure and facilitate soldering the package structure onto circuit boards via surface-mount technology (SMT)

Second Embodiment

Figure 4:
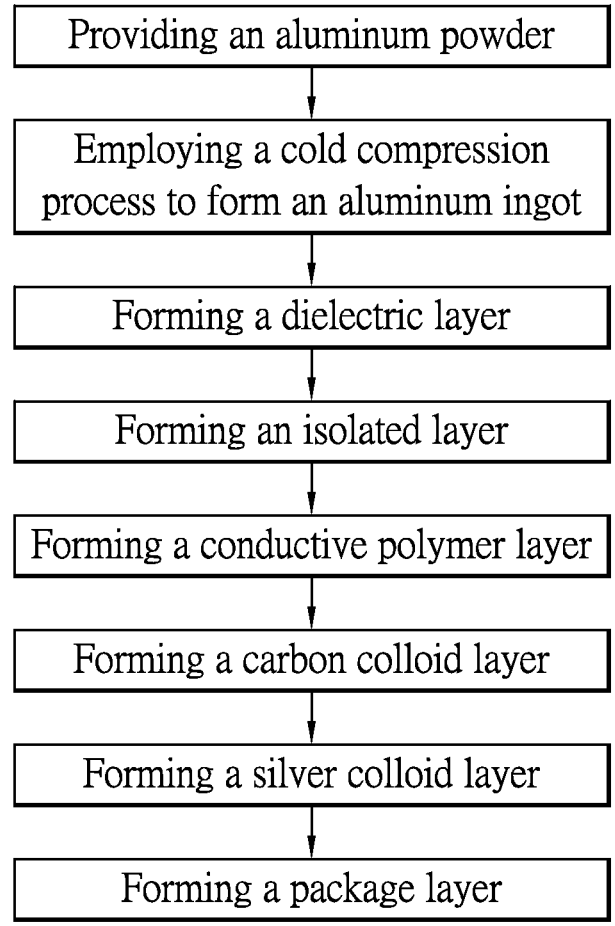
FIG. 4 is a flow chart illustrating a method for improving fabrication of solid electrolytic capacitors according to a second embodiment of the instant disclosure.
Figure 5:
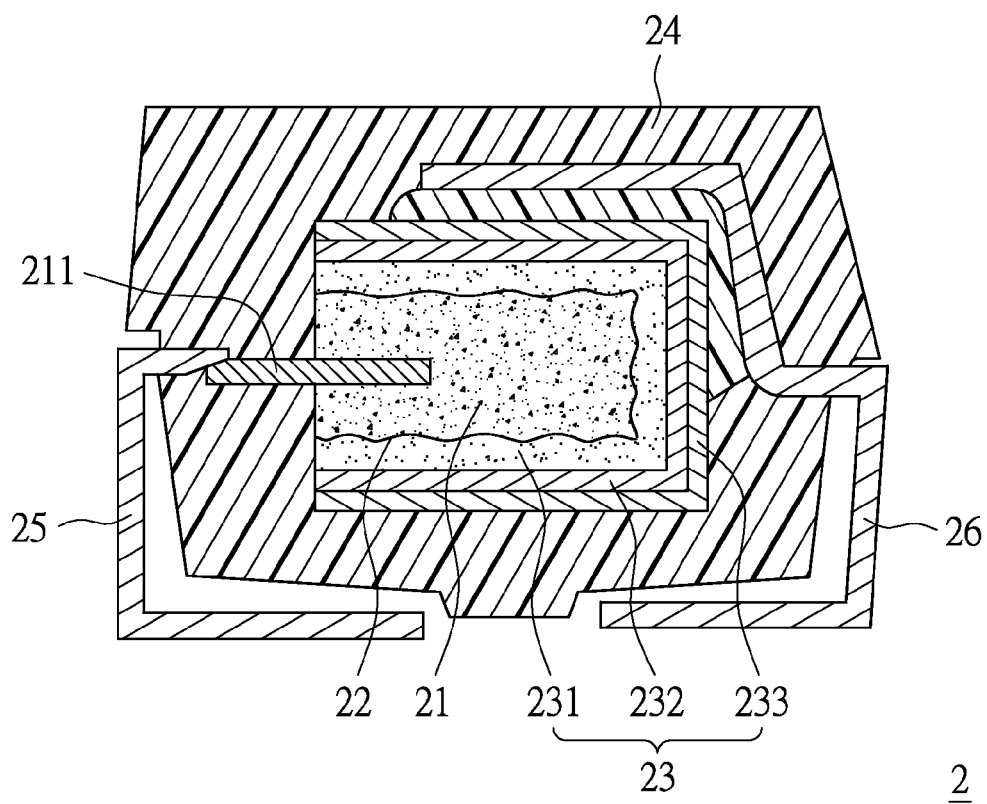
FIG. 5 is a cross-sectional view of a method for improving fabrication of solid electrolytic capacitors according to the second embodiment of the instant disclosure.

FIG. 4 is a flow chart and in conjunction with FIG. 5 illustrate a second embodiment for the method. Foremost, a powder of aluminum is provided. The aluminum powder may contain a binder such as camphor, stearic acid, polyvinyl alcohol, or naphthalene. The preferred aluminum powder is formed with the binder while the preferred weight percent of the binder ranges from 3 to 5%.

Next, a thoroughly mixed aluminum powder and binder mixture is cold compressed into a plurality of rectangular parallelepiped aluminum pellets 21 with a compression molding process. Preferably, the cold press load ranges from 3 to 15 MN/m$^2$ to provide the desired bulk density. In addition, a lead electrode 211 is inserted within the aluminum powder in a cantilever fashion during the cold press process for mutually communicating electricity. The preferred lead electrode 211 is an aluminum or a tantalum wire but not limited to the examples provided therein. The preferred lead electrode 211 in the second embodiment is a 20 μm aluminum wire to further reduce thickness of components in a capacitor but not limited to examples provided therein. Moreover, the preferred capacitor fabricated has high capacitance or low leakage rate. By etching the aluminum powder unevenly and cavernously on the surface before the cold press process, the surface area of the aluminum powder is increased, thus providing improved capacitance.

The compressed aluminum pellet 21 is further chemically treated, specifically anodized, to form an oxide coating, specifically an insulating aluminum oxide film, on the surface of the pellet 21, thereby forming a dielectric layer 22. Similar to the first embodiment, the chemical treatment may also use electrochemical formation treatment or chemical solution to control the thickness of the dielectric layer 22 being formed. The dielectric layer 22 of the second embodiment is produced by an ammonium adipate based, a phosphoric acid based or the combination solution thereof. An alternative to the chemical treatment of the second embodiment is to immerse the aluminum pellet 21 into an electrolyte bath for cross oxidation, heat treating and therefore producing a dense dielectric layer 22, specifically an oxidized film.

A conductive polymer layer 231 is formed on the surface of the dielectric layer 22, then a carbon gel layer 232 is formed on the surface of the conductive polymer layer 231, and a silver gel layer 233 is formed on the surface of the carbon gel layer 232 resulting in a cathode (not marked). Similar to the first embodiment, the aluminum pellet 21 of the second embodiment is formed with a lead electrode 211 extruding therefrom in a cantilever fashion and resulting in an anode (not marked). As a result, a conductive layer 23 is formed.

The lead electrode 211 and the conductive layer 23 are separately and electrically connected to a conductive terminal such as an anode 25 and a cathode 26 through a conductive bonding agent. Successively, the lead electrode 211, the conductive layer 23, part of the anode 25 and cathode 26 are covered by a resin-type coating, cured, and aged to form a packaging structure 24, thereby fabricating a solid electrolytic capacitor 2 of the second embodiment.

Figure 6:
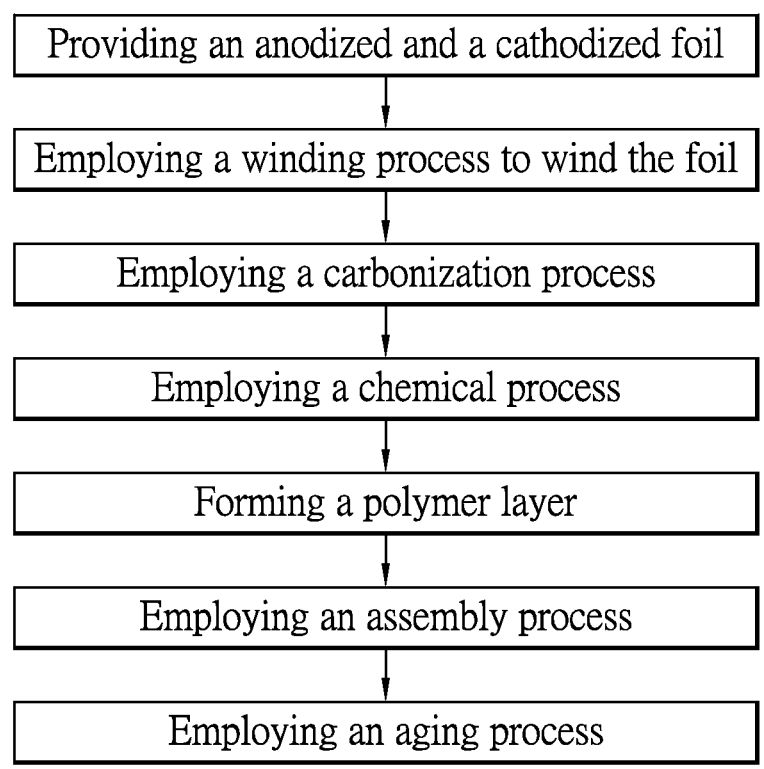
FIG. 6 is a flow chart illustrating a method for improving fabrication of solid electrolytic capacitors according to a third embodiment of the instant disclosure.
Figure 7:
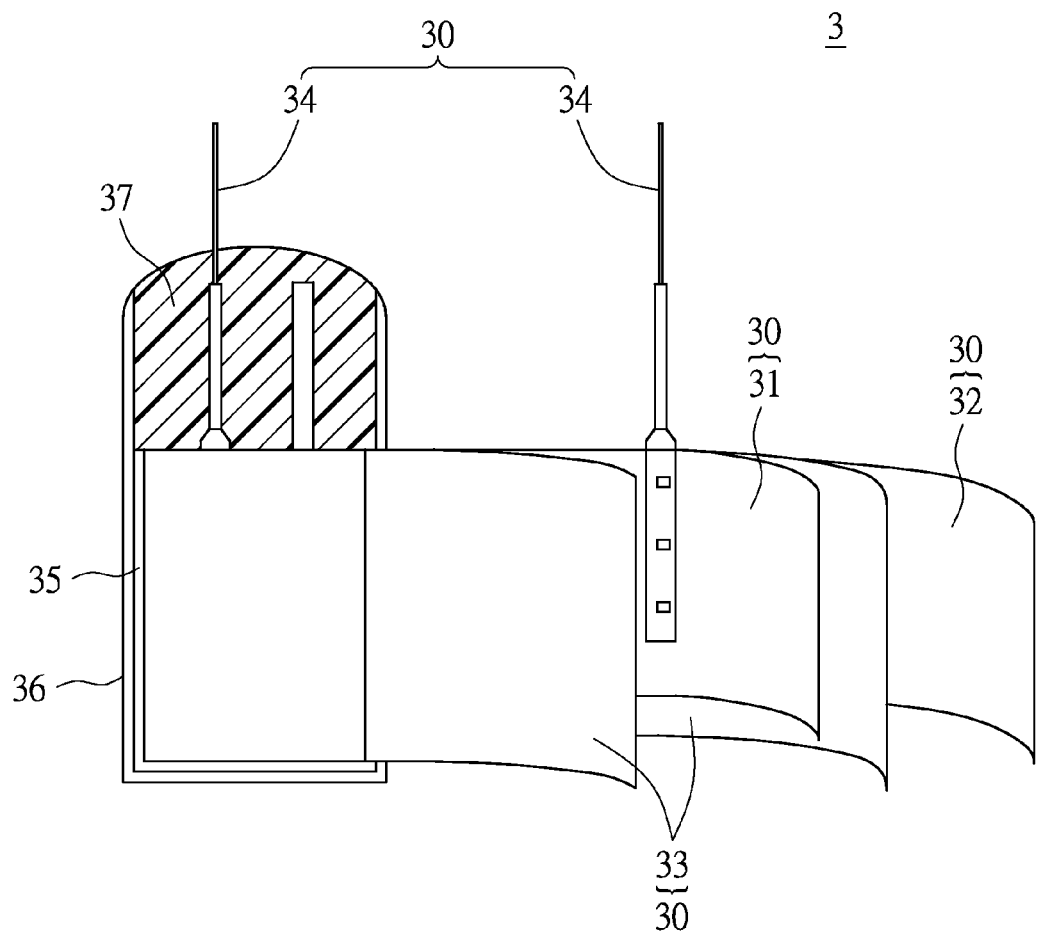
FIG. 7 is a cross-sectional view of a method for improving fabrication of solid electrolytic capacitors according to the third embodiment of the instant disclosure.

A flow chart in FIG. 6 and FIG. 7 illustrate the third embodiment of the method in the instant disclosure. Initially, a powder of aluminum is sprayed onto a sheet of aluminum and dried through a high temperature sintering process resulting with a porous aluminum sintered body. An oxide film is then formed by oxidation on the sintered body resulting with an anodized foil 31. In addition, a cathodized foil 32 is also formed. Please refer to the first embodiment for the preferred time and temperature of the high temperature sintering process. The aluminum powder may also include titanium or hydride based sintering agent as the raw aluminum powder. Moreover, preferred examples of the cathodized foil 32 may contain carbon, aluminum, and titanium but are not limited to the examples provided therein.

Next, a preferred spacer 33 or a thin sheet of suitable materials such as Manila hemp fiber electrolytic paper and a lead electrode 34 are wound between the anodized foil 31 and the cathodized foil 32 to form a capacitor core 30. The preferred spacer 33 material is Manila hemp fiber electrolytic paper but is not limited to the example provided herein. The preferred thickness of the spacer 33 is from 30 to 60 μm while the preferred density is from 0.2 to 0.6 g/cm$^3$.

Moreover, the capacitor core 30 is carbonized or similar carbonization techniques at a preferred temperature ranging from 200° C. to 300° C. Sequentially, the capacitor core 30 is immersed into an electrolyte bath to form a dielectric layer. Consecutively, the capacitor core 30 is dipped into a polymer solution, and heat treated to cure after removed from the solution to form a polymer layer 35 with preferably high conductivity.

The capacitor core 30 is housed by an aluminum cover 36. Then an epoxy resin, a butyl rubber or a preferably suitable sealant packages and seals the capacitor core 30 and an aluminum cover 36 therein while exposing the lead electrode 34, thus resulting in a package structure 37.

Successively, the package structure 37 is cured and aged to form a solid electrolytic capacitor 3 of the third embodiment. Temperature and time of the aging process may be adjusted depending on the type, capacity, and voltage of the capacitor.

In summary, the first embodiment illustrates the conductive gel containing aluminum powder partially screen-printed onto the insulating substrate 10, and subsequently high temperature sintering the insulating substrate 10 to form the aluminum substrate 11. As a result, the fabrication process is simplified, production time is reduced, and the yield of capacitor is improved through precisely controlling the thickness and length of the aluminum substrate 11. In the second embodiment of the instant disclosure differs from the first embodiment in terms of the form of aluminum and technique to fabricate the capacitor, wherein the aluminum powder is cold compressed to form an aluminum pellet 21 instead of high temperature sintering. Furthermore, the aluminum powder maybe pre-treated to obtain higher surface area to increase capacitance of the capacitor while aluminum powder replaces tantalum powder to resolve problems generated during the production of tantalum based capacitors. The three embodiments of the instant disclosure effectively simplify the fabrication of the solid electrolytic capacitors through altering the physical and chemical characteristics of aluminum powder.

The aforementioned illustrations and detailed descriptions are exemplarities for the purpose of further explaining the scope of the instant disclosure. Other objectives and advantages related to the instant disclosure will be illustrated in the subsequent descriptions and appended drawings.

What is claimed is:
1. A method for improving fabrication of solid electrolytic capacitors comprising the steps of:
   employing a cold press process to form an aluminum pellet from a powder of aluminum;
   forming a dielectric layer on the surface of the aluminum pellet; and
   forming a conductive layer on the surface of the dielectric layer;
   wherein the step of forming the conductive layer further comprises the steps of:

forming a conductive polymer layer on the surface of the dielectric layer;

forming a carbon gel layer on the surface of the conductive polymer layer and forming a silver gel layer on the surface of the carbon gel layer.

2. The method as recited in claim 1, wherein the powder of aluminum has uneven and cavernous surfaces.

3. The method as recited in claim 1, wherein the step of cold press forming the aluminum pellet includes a lead electrode to be inserted with the aluminum powder to form the aluminum pellet, and a compression load ranging from 3 to 15 MN/m$^2$.

4. A method for improving fabrication of solid electrolytic capacitors comprising the steps of:

employing a cold press process to form an aluminum pellet from a powder of aluminum;

forming a dielectric layer on the surface of the aluminum pellet; and forming a conductive layer on the surface of the dielectric layer;

wherein the step of forming the conductive layer further comprises the steps of:

forming a conductive polymer layer on the surface of the dielectric layer; and forming a silver gel layer on the surface of the conductive polymer layer.

\* \* \* \* \*